(12) United States Patent
MacDonald

(10) Patent No.: US 9,296,075 B2
(45) Date of Patent: Mar. 29, 2016

(54) DIE CASE EXTRACTOR AND METHOD

(71) Applicant: Acument Intellectual Properties, LLC, Sterling Heights, MI (US)

(72) Inventor: Kevin Andrew MacDonald, Bay City, MI (US)

(73) Assignee: Acument Intellectual Properties, LLC, Sterling Heights, MI (US)

( * ) Notice: Subject to any disclaimer, the term of this patent is extended or adjusted under 35 U.S.C. 154(b) by 321 days.

(21) Appl. No.: 13/735,570

(22) Filed: Jan. 7, 2013

(65) Prior Publication Data

US 2013/0232755 A1    Sep. 12, 2013

Related U.S. Application Data

(60) Provisional application No. 61/608,224, filed on Mar. 8, 2012.

(51) Int. Cl.
| | |
|---|---|
| B23P 19/00 | (2006.01) |
| B23P 19/04 | (2006.01) |
| B23P 11/00 | (2006.01) |
| B25B 27/02 | (2006.01) |

(52) U.S. Cl.
CPC .............. *B23P 19/04* (2013.01); *B23P 11/00* (2013.01); *B25B 27/02* (2013.01); *Y10T 29/49822* (2015.01); *Y10T 29/53796* (2015.01); *Y10T 29/53848* (2015.01); *Y10T 29/53857* (2015.01); *Y10T 29/53991* (2015.01)

(58) Field of Classification Search
USPC .......... 29/426.1, 426.5, 426.6, 244, 256, 258, 29/259, 260, 281.6, 282
See application file for complete search history.

(56) References Cited

U.S. PATENT DOCUMENTS

| | | | | | |
|---|---|---|---|---|---|
| 3,340,593 | A | * | 9/1967 | Savastano | 29/262 |
| 3,702,089 | A | * | 11/1972 | Bachhuber | 86/32 |
| 4,273,024 | A | * | 6/1981 | Veloni | 86/1.1 |
| 4,437,220 | A | * | 3/1984 | Gregory | 29/426.5 |
| 4,633,562 | A | * | 1/1987 | Ulsh | 29/264 |
| 4,665,602 | A | * | 5/1987 | Woodward et al. | 29/254 |
| 4,724,608 | A | * | 2/1988 | Parrott | 29/724 |
| 4,771,528 | A | * | 9/1988 | Stromberg | 29/259 |
| 4,868,965 | A | * | 9/1989 | Drymon | 29/259 |
| 5,349,736 | A | * | 9/1994 | Rubino et al. | 29/426.5 |
| 5,367,927 | A | * | 11/1994 | Frettered | 81/488 |

(Continued)

FOREIGN PATENT DOCUMENTS

JP            09075488  A  *  3/1997  ............. A63B 53/06

*Primary Examiner* — Essama Omgba
(74) *Attorney, Agent, or Firm* — Clark Hill PLC; James R. Foley

(57) ABSTRACT

A die case extractor and method for extracting a die case from a die bed. The die case extractor is engaged with the die case which is disposed in the die bed. The die case extractor is engaged by a pulling device, such as a ram. When the pulling device is retracted from the die bed, the die case extractor pulls on the die case, thereby extracting the die case from the die bed. Preferably, the die case extractor includes a bracing piece that is engaged with the die case. The die case extractor also preferably includes a member, such as a screw, which is engaged with the bracing piece. A holder is retained on the member and is engaged by the ram. The ram is then retracted generally away from the die bed, thereby pulling on the die case and extracting the die case from the die bed. Preferably, multiple die case extractors can be used simultaneously to extract a plurality of die cases in a single pulling action of the ram.

16 Claims, 2 Drawing Sheets

(56) References Cited

U.S. PATENT DOCUMENTS

| | | | |
|---|---|---|---|
| 6,212,775 B1* | 4/2001 | Sarver et al. | 29/898.08 |
| 6,305,061 B1* | 10/2001 | King | 29/259 |
| 6,415,491 B1* | 7/2002 | Klann | 29/259 |
| 6,502,293 B1* | 1/2003 | Khurana | 29/426.5 |
| 6,877,198 B2* | 4/2005 | Shevela | 29/264 |
| 7,328,501 B2* | 2/2008 | Smiley et al. | 29/721 |
| 8,256,081 B2* | 9/2012 | Fridman | 29/255 |
| 8,931,156 B1* | 1/2015 | Zimmer et al. | 29/426.1 |
| 8,959,743 B2* | 2/2015 | Mariano et al. | 29/426.1 |
| 2002/0026701 A1* | 3/2002 | Klann | 29/259 |
| 2004/0031139 A1* | 2/2004 | English | 29/244 |
| 2005/0257360 A1* | 11/2005 | Smiley et al. | 29/426.5 |
| 2010/0077584 A1* | 4/2010 | Fridman | 29/244 |
| 2010/0236039 A1* | 9/2010 | Robledo | 29/256 |
| 2011/0094076 A1* | 4/2011 | Liu | 29/244 |
| 2011/0131783 A1* | 6/2011 | Betcher et al. | 29/426.5 |
| 2011/0214269 A1* | 9/2011 | Yu | 29/259 |
| 2013/0283588 A1* | 10/2013 | Betcher et al. | 29/426.5 |
| 2015/0000096 A1* | 1/2015 | Gilbreath | 29/426.1 |
| 2015/0209918 A1* | 7/2015 | Andrews | 29/426.1 |

* cited by examiner

DIE CASE EXTRACTOR AND METHOD

PRIOR APPLICATION

Priority Claim

This application claims the benefit of U.S. Provisional Application Ser. No. 61/608,224, filed on Mar. 8, 2012, which is hereby incorporated herein by reference in its entirety.

BACKGROUND

The present invention generally relates to die cases, and more specifically relates to a die case extractor and method for extracting a die case from a die bed.

Some part-forming machines, such as machines for making metal parts (i.e., nuts, etc.), provide that a die bed is used to hold a plurality of dies for forming the part. Rather than having the die bed and dies be in direct contact with each other, die cases are typically used between the die bed and the dies to effectively provide a buffer therebetween. In use, a ram holds tools, such as punches, and the ram is brought into engagement with the die bed to form metal parts inside the die cases. During production of the parts, the die cases act as shells and also provide compressive radial forces on the dies. Use of the die cases allows the dies to last longer and not break as quickly, given the repetitive tensile forces that result from forming the metal parts inside the dies.

Typically, when it is time to replace a die case, such as for example when too much debris has collected in the die case, or such as after the die case has failed during use (such as cracked), the die case is removed using a pry bar. More specifically, a pry bar is engaged with a bolt and washer assembly which is threadably engaged with a threaded bore on the die case. The pry bar is used to engage the bolt and washer assembly, and pry the die case out of the die bed. Oftentimes, the die case is wedged very tightly in the die bed. As such, very often it takes considerable effort and/or time to remove a die case from a die bed using a pry bar.

SUMMARY

An object of an embodiment of the present invention is to provide an apparatus for extracting a die case from a die bed.

Another object of an embodiment of the present invention is to provide a method for extracting a die case from a die bed.

Briefly, an embodiment of the present invention provides a die case extractor which is configured to extract a die case from a die bed. The die case extractor is configured to be retained by a pulling device, such as a ram, and the die case extractor is configured to engage and pull on the die case when the pulling device is retracted from the die bed, thereby extracting the die case from the die bed.

Another embodiment of the present invention provides a method of extracting a die case from a die bed. The method provides that a pulling device, such as a ram, is engaged with a die case extractor. The die case extractor is also engaged with the die case, and the pulling device is retracted from the die bed, thereby extracting the die case from the die bed.

BRIEF DESCRIPTION OF THE DRAWINGS

The organization and manner of the structure and operation of the invention, together with further objects and advantages thereof, may best be understood by reference to the following description taken in connection with the accompanying drawings wherein like reference numerals identify like elements in which.

DESCRIPTION OF ILLUSTRATED EMBODIMENTS

Figure 1:
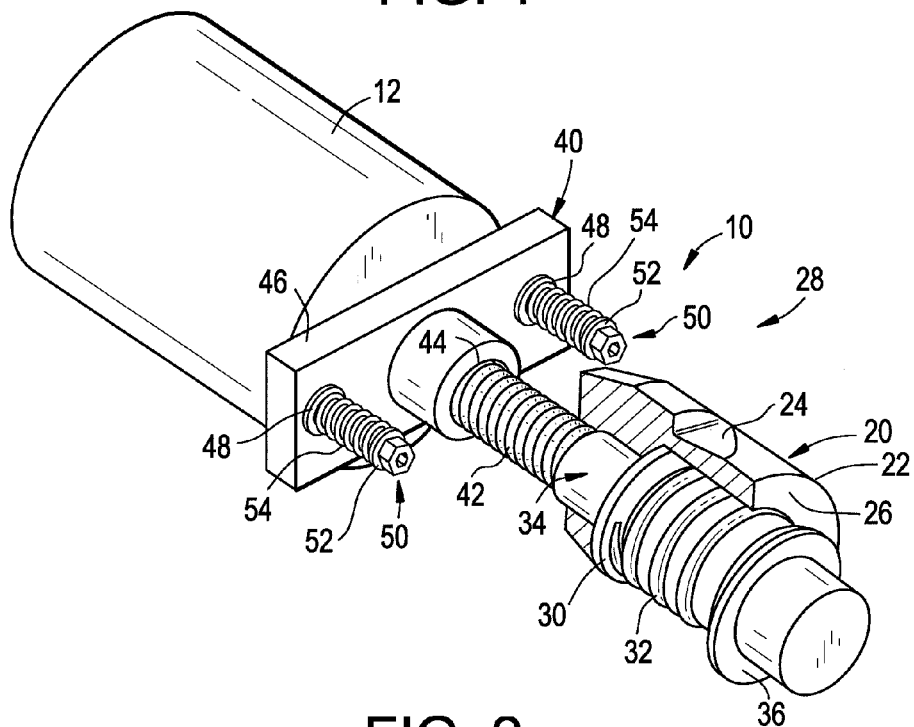
FIG. 1 is a perspective view of a die case extractor which is in accordance with an embodiment of the present invention.

While this invention may be susceptible to embodiment in different forms, there are shown in the drawings and will be described herein in detail, specific embodiments with the understanding that the present disclosure is to be considered an exemplification of the principles of the invention, and is not intended to limit the invention to that as illustrated.

Figure 2:
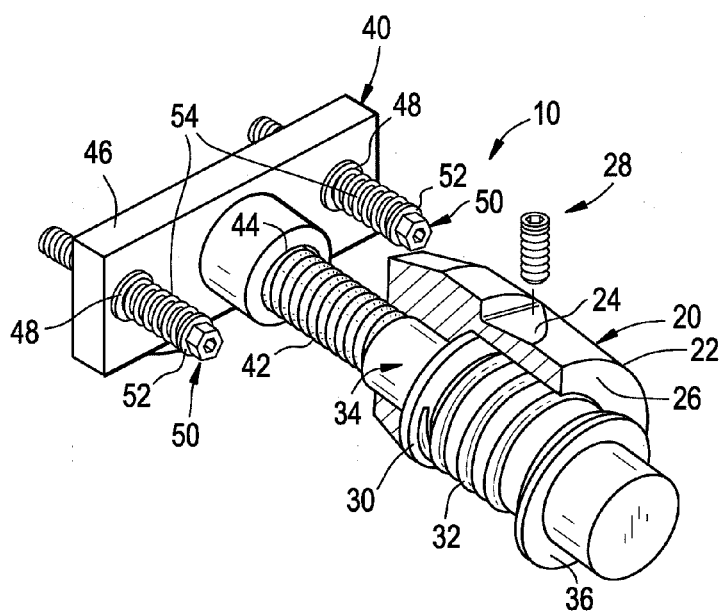
FIG. 2 is a perspective view similar to that of FIG. 1, but showing the die case extractor engaged with a die case.
Figure 3:
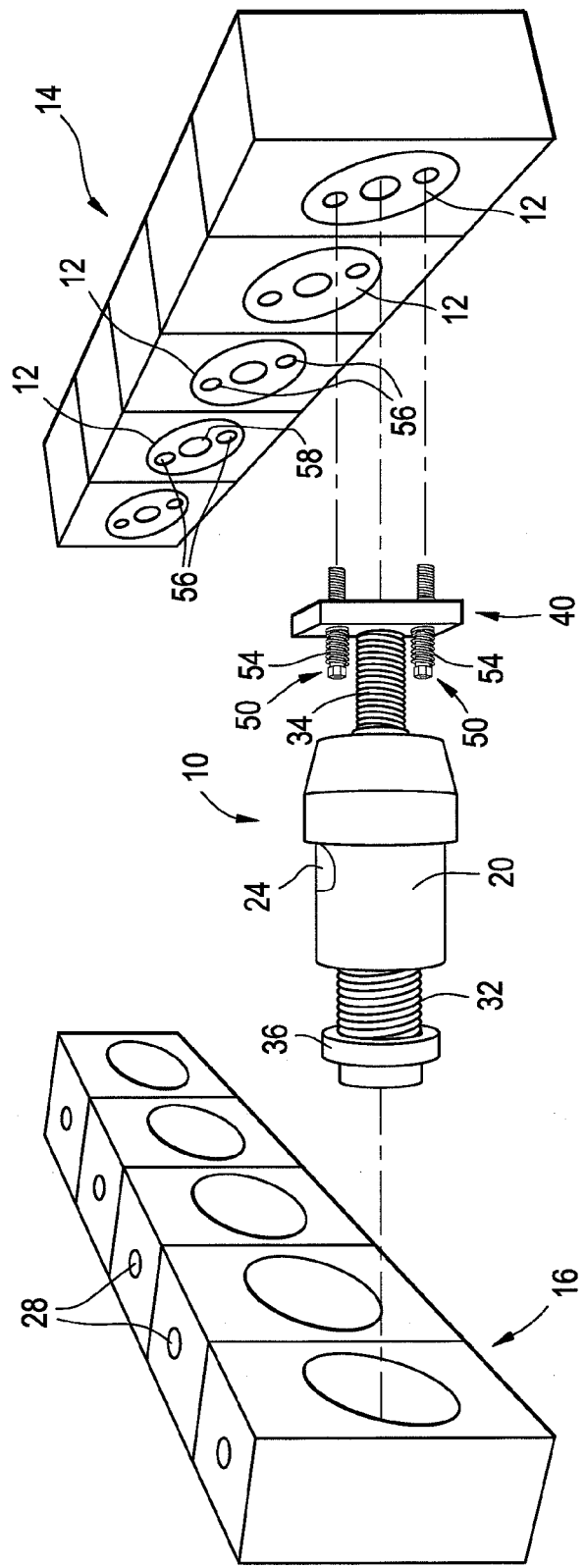
FIG. 3 shows the positioning of the die case extractor relative to a ram and a die bed, when the die case extractor is used to extract a die case from the die bed.

FIG. 1 illustrates a die case extractor 10 which is in accordance with an embodiment of the present invention. The die case extractor 10 is configured to extract a die case 12 from a die bed 14 (see FIG. 3). FIG. 2 shows the die case extractor 10 engaged with a die case 12 as well as a pulling device, such as a ram 16, for engaging and extracting the die case 12. FIG. 3 shows the ram 16, the die bed 14 which has the die case 12 disposed therein, and the die case extractor 10 being used to pull on the die case 12.

As shown, the die case extractor 10 may comprise a holder 20 in the form of a generally cylindrical, hollow sleeve 22. However, the holder 20 may take other forms. Regardless of the specific form the holder 20 takes, preferably the holder 20 is configured to be engaged and pulled by a pulling device, such as a ram 16, as is shown in FIG. 3. As shown in FIGS. 1-3, the holder 20 may have a notch 24 on its exterior surface 26 which is configured to be engaged by a set screw 28 which is on the ram 16.

Preferably, the holder 20 retains a washer 30 and a compression spring 32 therein, and a threaded member such as threaded screw 34 extends through the holder 20, through the washer 30 in the holder 20, and through the compression spring 32. The threaded screw 34 preferably has a flange 36 thereon, and the compression spring 32 is retained inside the holder 20, generally between the washer 30 and the flange 36 which is on the threaded screw 34.

As shown in FIGS. 1 and 2, preferably the die case extractor 10 also comprises a bracing piece 40, and an end 42 of the threaded screw 34 is configured to threadably engage a threaded bore 44 which is provided in the bracing piece 40. In addition to the threaded bore 44 which is provided on the bracing piece 40 for threadably receiving the threaded screw 34, preferably the bracing piece 40 also generally comprises a plate 46 having a plurality of threaded bores 48 for receiving threaded screws 50, such as M6 screws. Preferably, these screws 50 also include a flange 52 thereon which generally works to retain a compression spring 54 thereon, between the flange 52 and the bracing piece 40.

As shown in FIG. 2, the screws 50 not only threadably engage the threaded bores 48 on the plate 46 of the bracing piece 40 of the die case extractor 10, but also extend past the bracing piece 40 and threadably engage corresponding threaded bores 56 (see FIG. 3) which are provided on the die case 12 itself. This threaded engagement tends to couple the die case 12 to the bracing piece 40.

In use, when a die case 12 is to be extracted from a die bed 14 (see FIG. 3), the ram 16 is positioned generally away from the die bed 14, and the screws 50 are used to effectively couple the bracing piece 40 to the die case 12 (i.e., by threadably engaging both the threaded bores 48 in the plate 46 of the bracing piece 40 and the threaded bores 56 in the die case 12). One or more set screws 28 of the ram 16 are engaged with the die case extractor 10 (such as with notch 24). This effectively couples the ram 16 to the die case extractor 10. The ram 16 is then brought even closer to the die bed 14, and the threaded screw 34 is threadably engaged with the threaded bore 44 in the bracing piece 40. Due to the engagement of the screws 50 with both the threaded bores 48 in the bracing piece 40 and the threaded bores 56 in the die case 12, this effectively couples the die case extractor 10 to the die case 12. With the die case extractor 10 already being effectively coupled to the ram 16 via one or more set screws 28 of the ram 16 engaging the holder 20, the die case extractor 10 is poised to be used to extract the die case 12 from the die bed 14 using the ram 16.

Thereafter, retraction of the ram 16 generally away from the die bed 14 causes the die case 12 in the die bed 14 to be extracted from the die bed 14. Specifically, the force of the ram 16 works to effectively pull the die case 12 out of its pocket 58 in the die bed 14. The washer 30 on the threaded screw 34 and the compression spring 32 which is in the holder 20, retained on the threaded screw 34, effectively allows enough pressure to be distributed on the die case extractor 10 as a whole so that the two screws 50 do not get stripped in the die case 12.

As discussed, preferably one compression spring 32 is provided in the holder 20 of the die case extractor 10, and preferably two additional compression springs 54 are provided on the screws 50. These three (3) compression springs 32, 54 are employed in order to provide a gradual pulling force when the ram 16 is retracted from the die bed 14. In contrast, brute force or a dead blow could be fatal for the threaded screws 50 holding the bracing piece 40 to the die case 12. When the die case extractor 10 is used to extract the die case 12 from the die bed 14, the compressive forces of the three (3) compression springs 32, 54 are relied upon to effectively gradually extract the die case 12 from the die bed 14.

As shown in FIG. 3, the die bed 14 may include a plurality of die cases 12. Of course, a plurality of die case extractors 10 can be used simultaneously to extract a plurality of die cases 12 from the die bed 14 in a single ram retraction action.

While specific embodiments of the invention have been shown and described, it is envisioned that those skilled in the art may devise various modifications without departing from the spirit and scope of the present invention.

What is claimed is:

1. A die case extractor which is configured to be used by a pulling device to extract a die case from a die bed, said die case extractor being configured to be retained by the pulling device, wherein the die case extractor is configured to engage the die case and pull on the die case when the pulling device is retracted from the die bed, thereby extracting the die case from the die bed, said die case extractor comprising: at least one compression spring configured to provide that the die case is pulled gradually by the die case extractor; a holder; a washer; and a threaded member, wherein the holder retains the washer and the at least one compression spring therein, and the threaded member extends through the holder, through the washer in the holder, and through the at least one compression spring.

2. A die case extractor as recited in claim 1, wherein the holder comprises a cylindrical, hollow sleeve.

3. A die case extractor as recited in claim 1, wherein the holder has an exterior surface, wherein a notch is on the exterior surface, wherein the notch is configured to be engaged by a fastener which is on a ram of the pulling device.

4. A die case extractor as recited in claim 1, wherein the threaded member comprises a threaded screw having a flange thereon, wherein the at least one compression spring is retained inside the holder, generally between the washer and the flange which is on the threaded screw.

5. A die case extractor as recited in claim 4, further comprising a bracing piece having a threaded bore, wherein the threaded screw has an end, wherein the end of the threaded screw is configured to threadably engage the threaded bore in the bracing piece.

6. A die case extractor as recited in claim 5, wherein the bracing piece further comprises a plate having a plurality of threaded bores for receiving threaded fasteners, wherein each of the threaded fasteners comprises a flange which retains at least one of said at least one compression spring thereon, between the flange and the bracing piece.

7. A die case extractor as recited in claim 6, wherein the threaded fasteners are configured to not only threadably engage the threaded bores on the plate of the bracing piece, but also extend past the bracing piece and threadably engage corresponding threaded bores which are provided on the die case, whereby the threaded fasteners couple the bracing piece to the die case.

8. A method of using a pulling device to gradually extract a die case from a die bed, said method comprising: providing a die case extractor comprising a holder having an exterior surface, a notch on the exterior surface, a washer, a threaded member, wherein the holder retains the washer and at least one compression spring therein, wherein the threaded member extends through the holder, through the washer in the holder, and through the at least one compression spring; engaging the pulling device with the die case extractor; engaging a fastener on a ram of the pulling device with the notch on the exterior surface of the holder, thereby securing the holder to the ram; engaging the die case extractor with the die case; retracting the pulling device from the die bed; causing the at least one compression spring to compress, thereby gradually extracting the die case from the die bed.

9. A method as recited in claim 8, wherein the step of engaging the die case extractor with the die case comprises using fasteners to couple the die case extractor to the die case.

10. A method as recited in claim 8, wherein the step of engaging the pulling device with the die case extractor comprises engaging a fastener on the pulling device with the die case extractor.

11. A method as recited in claim 8, wherein the step of engaging the pulling device with the die case extractor comprises engaging a set screw of the pulling device with a holder of the die case extractor.

12. A method as recited in claim 8, further comprising engaging a threaded screw with a threaded bore in a bracing piece of the die case extractor, engaging a plurality of threaded fasteners with both the bracing piece and the die case, and engaging a set screw of the pulling device with the holder of the die case extractor.

13. A method as recited in claim 8, further comprising engaging the threaded member with a threaded bore in a bracing piece of the die case extractor, engaging a plurality of threaded fasteners with both the bracing piece and the die case, and engaging a set screw of the pulling device with the holder of the die case extractor.

14. A die case extractor which is configured to be used by a pulling device to extract a die case from a die bed, said die case extractor being configured to be retained by the pulling device, wherein the die case extractor is configured to engage the die case and pull on the die case when the pulling device is retracted from the die bed, thereby extracting the die case from the die bed, wherein the die case extractor comprises a holder, further comprising a washer, a compression spring, and a threaded member, wherein the holder retains the washer and the compression spring therein, and the threaded member extends through the holder, through the washer in the holder, and through the compression spring.

15. A die case extractor as recited in claim 14, wherein the threaded member comprises a threaded screw having a flange thereon, wherein the compression spring is retained inside the holder, generally between the washer and the flange which is on the threaded screw.

16. A die case extractor as recited in claim 15, further comprising a bracing piece having a threaded bore, wherein the threaded screw has an end, wherein the end of the threaded screw is configured to threadably engage the threaded bore in the bracing piece, wherein the bracing piece further comprises a plate having a plurality of threaded bores for receiving threaded fasteners, wherein each of the threaded fasteners comprises a flange which retains a compression spring thereon, between the flange and the bracing piece, wherein the threaded fasteners are configured to not only threadably engage the threaded bores on the plate of the bracing piece, but also extend past the bracing piece and threadably engage corresponding threaded bores which are provided on the die case, whereby the threaded fasteners couple the bracing piece to the die case.

\* \* \* \* \*